April 29, 1924.
A. W. AYLING
1,492,011
NESTED ARTICLE SEPARATION MECHANISM
Filed April 10, 1922
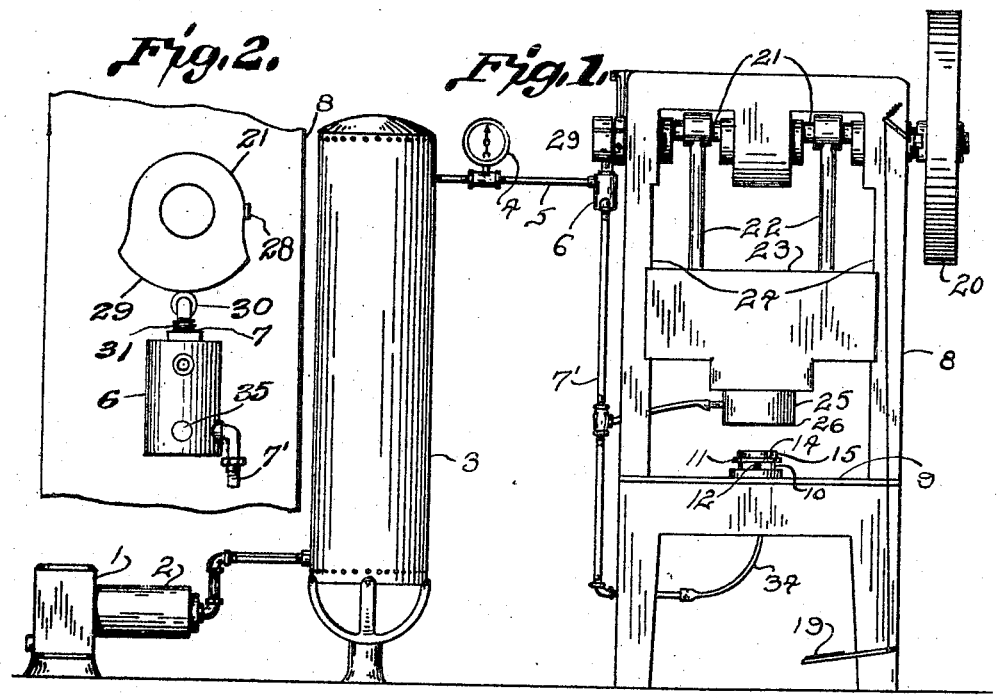
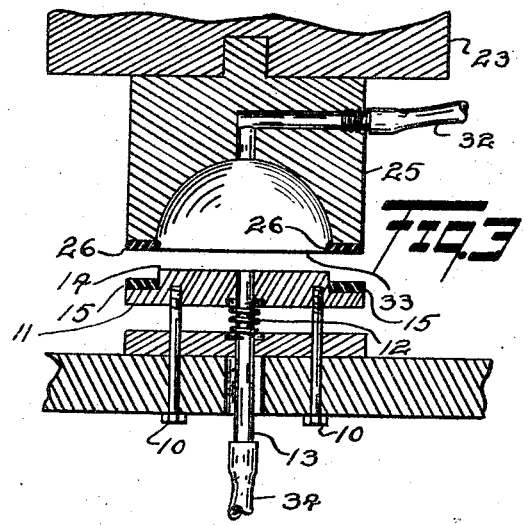
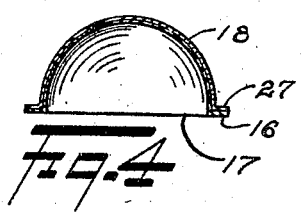

Patented Apr. 29, 1924.

1,492,011

UNITED STATES PATENT OFFICE.

ARTHUR W. AYLING, OF TOLEDO, OHIO.

NESTED-ARTICLE SEPARATION MECHANISM.

Application filed April 10, 1922. Serial No. 551,061.

*To all whom it may concern:*

Be it known that I, ARTHUR W. AYLING, a citizen of the United States of America, residing at Toledo, Lucas County, Ohio, have invented new and useful Nested-Article Separation Mechanisms, of which the following is a specification.

This invention relates to separating of nested articles.

This invention has utility in differential pressure release of hemispherical sheet metal sections.

Referring to the drawing:—

Fig. 1 is a side elevation of an embodiment of the invention as incorporated in connection with a press;

Fig. 2 is a detail view of the time control device;

Fig. 3 is an enlarged section of the co-operating seats; and

Fig. 4 is a view of a pair of the nested sections, say of a toilet float, which are to be separated.

For convenience in manufacture, the pressing of hemispherical sections for floats is in some practice done from a pair of copper sheets so that the resulting product is two sections nested. Inasmuch as these are pressed together in the common forming thereof, their nested or seating relation is one not easily disturbed. In the invention of this disclosure suction is applied for rapid separation without distortion of the sections.

Motor 1 may operate suction pump 2 for creating reduced pressure in tank 3, the extent of which may be disclosed by gage 4 in line 5 from this tank 3. This line 5 extends to valve 6 having plunger 7 normally maintaining the valve closed. From this vavle 6 extends line 7'. Press or machine frame 8 is shown as having bed 9. Loosely through this bed 9 are bolts 10 having threaded connection with a first seat 11 normally thrust away from the bed 9 by helical compression spring 12 centrally disposed about tubular stem 13.

Approximating the internal diameter of the nested sections to be separated, is upstanding portion 14 on this first seat 11. This upstanding portion 14 is surrounded by a yieldable packing or gasket 15. When flange 16 of one article 17 nested with outer article 18 is disposed on this gasket 15, the operator may depress treadle 19 serving to operate clutch mechanism for connecting continuously running drive wheel 20 to drive crank shaft 21 in the frame 8, thereby through connecting rods 22 forcing plunger 23 downward as directed by guides 24. This plunger 23 has mounted therewith a second seat 25 of general concave form having adjacent its edge and across its ring face a gasket or yieldable packing 26 movable in downward travel of the plunger 23 to rest snugly on flange 27 of outer nested article 18 in opposition to the gasket 15.

The operation of the press upon a quick depression of the treadle 19 and its release is for a single downward stroke of the plunger 23 with recover. In this downward travel the gasket 26 comes into gripping relation with the flange 27. As the plunger 23 continues to move, the spring 12 is compressed.

It is desirable in the operation of the machine not only to take care of the different gages or thicknesses of the articles, but also to take care of shock to the machine or to the article that the full stroke of the plunger 23 may not be to an extent to force the seat 11 into abutting relation with the bed 9.

Adjustably mounted by set screw 28 upon the shaft 21 is a control cam 29 disposed to engage roller 30 for forcing plunger 7 into the valve 6 against the resistance of spring 31 thereby to open the valve 6 to create a suction on the line 7. This line 7 has flexible connection 32 extending into concave chamber 33 of the second or upper seat 25. The line 7 has a second flexible section 34 connected to tube 13 protruding through the portion 14 of the first seat 11. In the positioning of the cam 29 on the shaft 21, it is desirable that the valve 6 be opened just after the gasket 26 comes into such snug fitting relation with the flange 27 as to force the flange 16 against the gasket 15. This means that the chamber 33 in the seat 25 about the outer hemispherical member 18 is exhausted at the same time that the concave side of the member 17 is exhausted or has its air pressure reduced. The extent of this cam 29 and its adjusted position is such that this exhausting interval may extend for a duration just beyond the point where the gasket 26 is moving away from the upper limit of travel of the gasket 15. If the plunger stroke be six inches and the depression of the seat 11 be one-half inch, it is desirable that this holding of the vacuum or suction be for a distance of travel upward of the flange 25 greater than one-half inch or say three-quarters of an inch to an inch. Accordingly, as the seat 25 moves away from the seat 11 with the suction still on in each of said seats, the nested articles 17 and 18 are each held toward their respective seats and accordingly pulled apart.

The adjustment of the cam 29 should be such that at once the pulling apart occurs the valve 6 is allowed to close so that exhaust air will not flow into the tank 3 to destroy the low pressure therein. The closing of the valve 6 permits air supply through opening 35 to flow into the line 7′, thereby giving a kick or releasing pressure so that the two sections 17, 18, are released from the seats, the section 18 falling to be assigned to one receptacle, while the section 17 is removed for disposal in another receptacle.

In the operation of this press, these separations may occur with great rapidity, in fact as high as forty per minute, and with but litle use of power for the setting of the cam may be such as to use very little air, and the spring 12 should only be strong enough to insure snug seating.

What is claimed and it is desired to secure by United States Letters Patent is:—

1. A pair of opposing relatively reciprocable seats for receiving nested articles one against each seat, and pressure controlling means to said seats effective as the seats move away from each other for separating the articles from their nested relation.

2. A seat for one article of a nest, a second opposing seat for another article of said nest, and means for moving the seats apart and holding the respective articles during said movement.

3. A seat for one article of a nest, a second opposing seat for another article of said nest, means for moving the seats apart, and pressure means for holding the respective articles during said movement.

4. A seat for one article of a nest, a second opposing seat for another article of said nest, means for moving the seats apart, and vacuum means for holding the respective articles during said movement.

5. A seat for one article of a nest, a second opposing seat for another article of said nest, means for moving the seats apart, vacuum means for holding the respective articles during said movement, and a release for the vacuum means.

6. A machine embodying a main frame, a first seat in said frame, a plunger reciprocable as to said frame, a second seat carried by the plunger and movable to a position adjacent the first seat, suction means coacting with said seats as separated by nested articles, and actuating means for moving the second seat away from the first with the suction means still effective.

7. A machine embodying a main frame, a first seat carried thereby, a plunger reciprocable in said frame, a second seat carried by the plunger and movable to position adjacent the first seat, a drive for the plunger, suction means controlled by the drive and connected to said seat for holding the nested articles in said seats as the plunger moves the first seat away from the second seat.

8. A machine embodying a main frame, a first yieldable seat carried thereby, a plunger reciprocable in said frame, a second seat carried by the plunger and movable to position adjacent the first seat, a drive for the plunger, suction means controlled by the drive and connected to said seat for holding the nested articles in said seats as the plunger moves the first seat away from recover position of the second seat.

In witness whereof I affix my signature.

ARTHUR W. AYLING.